UNITED STATES PATENT OFFICE.

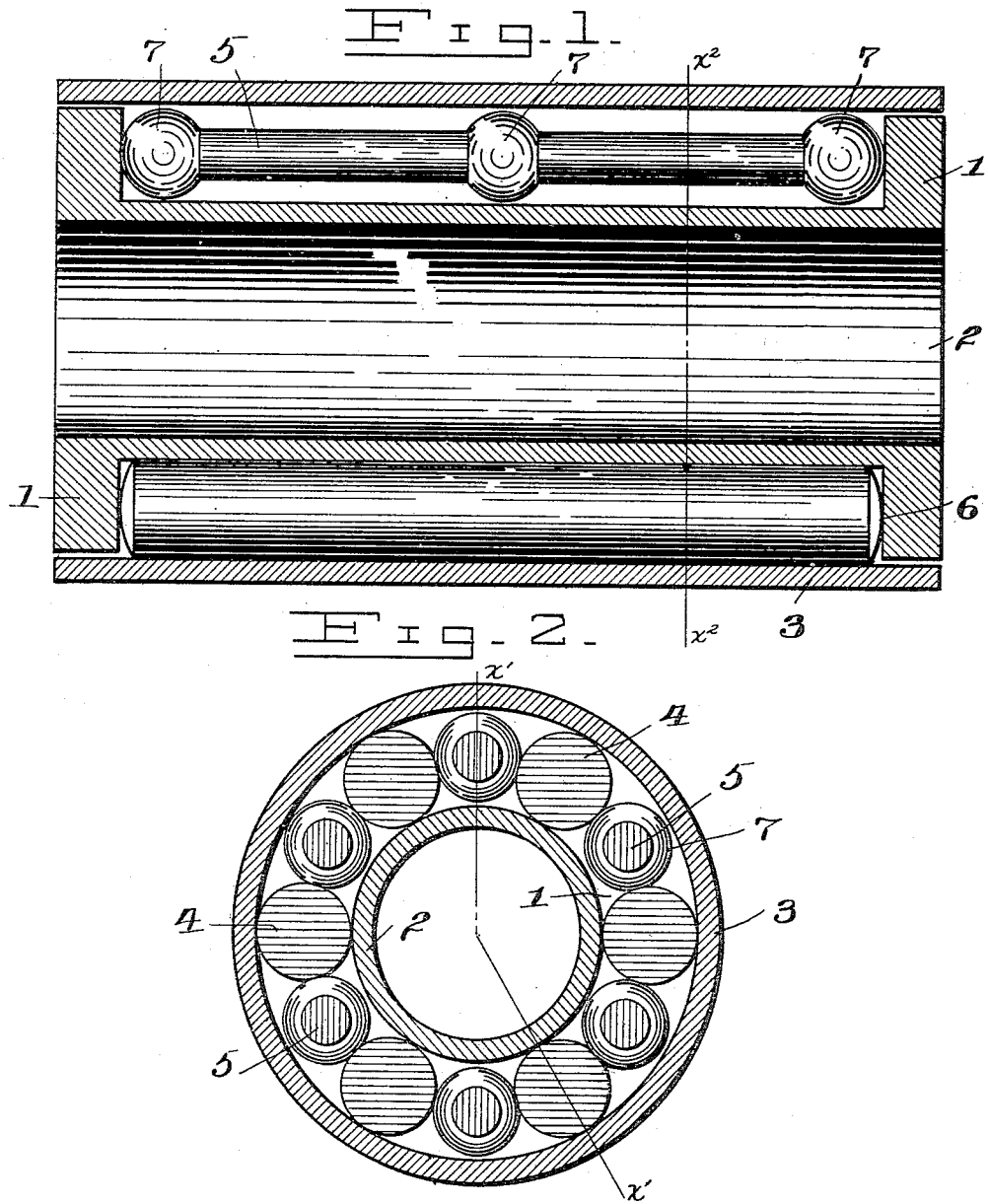

CHARLES R. HARRIS, OF LOS ANGELES, CALIFORNIA, ASSIGNOR TO OVER ALL ROLLER BEARINGS COMPANY, OF LOS ANGELES, CALIFORNIA, A CORPORATION OF CALIFORNIA.

ANTIFRICTION ROLLER-BEARING.

1,245,145.　　　　　　Specification of Letters Patent.　　　Patented Oct. 30, 1917.

Application filed July 24, 1916.　Serial No. 110,993.

*To all whom it may concern:*

Be it known that I, CHARLES R. HARRIS, a citizen of the United States, residing at Los Angeles, in the county of Los Angeles and State of California, have invented certain new and useful Improvements in Antifriction Roller-Bearings, of which the following is a specification.

My invention relates to an improvement in anti-friction roller-bearings, and the object is to provide a bearing of the character named, especially adapted to run without oil, it being an improvement on Letters Patent to Whitesides, No. 1,116,186, dated November 3, 1914.

The present invention comprises an inner and outer sleeve, the former preferably of spool form, and the latter constituting a housing in connection with bearing rollers and idlers, both of which have spherical ends which engage and bear against and are confined by the spool ends of the inner sleeve, whereby to reduce the friction thereon to a minimum.

It further consists in roller bearings and idlers, the bearing portions of which latter are of spherical form, whereby to lessen friction upon the sleeves and the rollers and admit ample air circulation to keep the bearings cool.

In the accompanying drawings:—

Figure 1 is a longitudinal section on the line $x'$—$x'$ of Fig. 2; and

Fig. 2 is a transverse section on the line $x^2$—$x^2$ of Fig. 1.

The numeral 1 is the spool formation at the opposite ends of the inner sleeve 2, which latter is keyed or otherwise secured to the axle.

By reason of the spool formation, a bearing surface is formed around the sleeve between its ends for the roller-bearings 4 and the idlers 5, the outer sleeve 3 constituting a housing which confines the rollers and idlers in place.

The roller-bearings have ball or spherical ends 6 which engage the spool ends of the inner sleeve at points merely, thus reducing the friction at the contacting ends to a minimum. The idlers are in the main of smaller diameter than the roller bearings and have spherical or partially spherical balls or heads 7 at the ends, to engage the spool ends 1 of the inner sleeve 2, as well as the run-way of the sleeve between said spool ends and the intermediate roller bearings 4. There are as many of these spherical balls as desired, according to the length of the bearing.

The object of these spherical balls is to minimize the friction both on the ends of the spool as well as the bearing surfaces of the same, and the contacting points with the roller-bearings, as stated.

The ball formation may be produced by simply turning down a straight roll in a lathe, in the form indicated.

I claim:

1. A roller bearing comprising inner and outer sleeves, intermediate rollers and idlers, the idlers having spherical balls at intervals thereon, and flanges arranged on the outer ends of the inner sleeve forming common bearing points for the ends of the rollers and idlers.

2. A roller bearing comprising an outer sleeve and inner flanged casing, intermediate rollers and idlers of approximately the same length received between the flanged casing and outer sleeve, the idlers having end and intermediate spherical balls formed thereon.

3. The combination with a flanged spool formed of inner sleeve, and an outer sleeve, of rollers and idlers of approximately the same length having convexed ends received between the flanges of the spool, the idlers of reduced diameter and having spherical balls formed at intervals thereon.

In testimony whereof I affix my signature.

CHARLES R. HARRIS.

Copies of this patent may be obtained for five cents each, by addressing the "Commissioner of Patents, Washington, D. C."